Patented May 13, 1930

1,758,277

UNITED STATES PATENT OFFICE

KARL DAIMLER AND GERHARD BALLE, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SUBSTITUTED ARYLSULPHONIC ACIDS AND PROCESS OF MAKING SAME

No Drawing. Application filed March 18, 1926, Serial No. 95,770, and in Germany April 1, 1925.

The present invention relates to aryl-polysulphonic acids which are substituted by at least one alkyl group having more than two carbon atoms and to a process of preparing the same.

Nuclear isopropylated naphthalene sulphonic acids or sodium salts thereof are prepared by first producing naphthalenesulphonic acid and then causing the formation of the isopropylated body by adding isopropyl alcohol at about 120° C., during which operation an excess of sulfuric acid must be present to effect the splitting off of water. As this working method requires a considerable excess of sulfuric acid which is left in a dilute form after the condensation is complete, it is necessary at the end of the operation to separate the excess of sulfuric acid or to destroy it, for instance, by treatment with lime. It is obvious that these two methods of removing the excess of sulfuric acid are onerous and cause losses of substance.

The object of our invention is to improve the sulphonating and condensation processes above referred to. We have found that by using particularly strong sulphonating agents, such as chlorosulphonic acid, oleum, or mixtures of both, instead of sulfuric acid, and by simultaneously sulphonating and condensing, the reaction between the hydrocarbons, sulphonating agents and higher alcohols, which in the hitherto known method takes place in two stages, can be carried out in a single stage. The time of the reaction is thus shortened and the sulphonating agent is consumed by the sulphonating process in such a quantity that the onerous separation of the excess of acid is avoided and losses of substance are prevented.

The use of strong sulphonating agents according to our present invention involves the further advantage that the temperature can be kept considerably lower than when sulphonating with sulfuric acid and yet substantially all of the naphthalene reacts. The use of the lower temperature is desirable in order to obtain the final product as nearly colorless as possible. A further advantage of the new products is that their wetting property becomes more efficient probably in consequence of the more intensive sulphonation. If oleum be used for the purpose in question, the sulphonation must be effected at such a temperature that a monosulphonation is excluded.

Furthermore our new working-method is not limited to the use of naphthalene and isopropyl alcohol; it can also be advantageously adopted when using other aromatic hydrocarbons (methylnaphthalene, benzene, toluene, xylene, solvent-naphtha, tetraline, cymene, anthracene or the like) or any other higher alcohol (butyl alcohol, cyclohexanol, fermentation fusel oil, etc.).

The process according to our invention is carried out in a single stage and under such conditions that the reaction does not cease, neither after the formation of condensation products which are free from sulfur nor after their monosulphonation, but proceeds directly to the formation of polysulphonic acids, which are much more useful than the monosulphonic acid, a fact which constitutes the principal value of our new process. Since higher temperatures are required for attaining the polysulphonation than for a mere mono-sulphonation, there was really great danger when the chloro-sulphonic acid is replaced by oleum without at the same time lowering the temperature, that the oleum would cause oxidative decompositions. As a matter of fact, however, these oxidative decompositions did not take place.

Furthermore we have found that the above described condensation products, such as the dipropylnaphthalenesulphonic acids and nuclear-alkylated, aralkylated or cycloalkylated aromatic sulphonic acids of analogous structure, such for instance as butylnaphthalenesulphonic acids, dibutylnaphthalenesulphonic acids, amylnaphthalenesulphonic acids, butylbenzylnaphthalenesulphonic acids, hexahydrophenylnaphthalenesulphonic acids etc. may advantageously be altered by treatment with an agent which is capable of reacting with two molecules of the substituted aryl-poly-sulphonic acid with the formation of a higher condensation product, such as formaldehyde, sulfur chloride or the like. For example, by a formaldehyde treatment the petroleum-like oder of the products, which in many cases is undersirable, can be made to disappear while their fastness to the action of lime and their antiseptic property can be enhanced. This treatment impairs the purifying power, the property of easily yielding froth, etc., of the products in question very little or not at all.

The product obtained by treatment with sulfur chloride in general contains at least two aryl nuclei, for example, two naphthalene nuclei, which are linked by at least one —S—S— bridge.

The following examples serve to illustrate our invention.

(1) To a mixture of 128 parts by weight of naphthalene and 74 parts by weight of n-butyl alcohol are added by drops at 60–70° C. 200 parts by weight of chlorosulphonic acid. This mixture is kept at 80–100° C. until the evolution of the hydrochloric acid has ceased and the product has become entirely soluble in water. The product may be directly used in the solid form or, if preferred, after having been diluted with some water. It may be put into a more marketable form by neutralization with caustic soda solution or ammonia and if desired by drying and pulverizing it. The powder is of a light color, readily soluble in water and of particular fastness to the action of lime. Instead of the n-butyl alcohol its isomerides or homologues may be used with just as good results. The final product thus obtained probably has about the following formula:

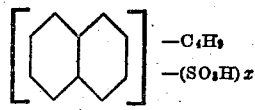

wherein $x$ stands for a hole number not greater than 6.

(2) Into 128 parts by weight of naphthalene are simultaneously dropped 148 parts by weight of n-butyl alcohol and 230 parts by weight of chlorosulphonic acid. The further operations are carried out as stated in Example 1. The product thus obtained, which has a light color and is soluble in water, possesses even in a somewhat higher degree the property of wetting than the product obtained according to Example 1. The final product thus obtained probably has about the following formula:

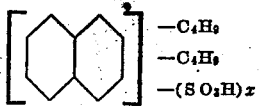

wherein $x$ stands for a whole number not greater than 6.

(3) Into 100 parts by weight of naphthalene and 100 parts of cyclohexanol are introduced by drops at 60–70° C. 200 parts by weight of chlorosulphonic acid during the course of 2 hours. After the mass has been stirred for one or several hours, it becomes soluble in water and no longer evolves hydrochloric acid. The mass is then worked up as indicated in Example 1. Anthracene may be used instead of naphthalene with just as good results. The product obtained from cyclohexanol is light-brown, the anthracene product dark grey. Both products are readily soluble in water and possess an excellent wetting property, etc. The final product thus obtained probably has about the following formula:

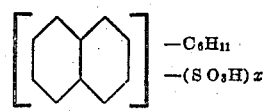

wherein $x$ stands for a whole number not greater than 6.

(4) Into 128 parts by weight of napthalene and 148 parts by weight of n-butyl alcohol is introduced by drops at 60–70° C. a mixture of 80 parts by weight of chlorosulphonic acid and 80 parts by weight of oleum of 60% strength. After having stirred the mass for some time at 80–90° C. there are gradually added by drops 110 parts by weight of the said mixture of acids. Stirring is then continued for several hours whereupon a clear water-soluble mass is obtained, which may be used as such or may be converted into the corresponding sodium salt. The yield in the form of the sodium salt amounts to 525 parts by weight. The product is a light-brown water-soluble powder possessing in a high degree the property of wetting. The final product thus obtained probably has about the following formula:

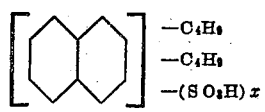

wherein $x$ stands for a whole number not greater than 6.

(5) Into 128 parts by weight of naphthalene are introduced by drops at 70–80° C. 148 parts by weight of n-butyl alcohol together with 160 parts of oleum of 20% strength. Then 130 parts of 60% oleum are added slowly at 80–90° C. After the mass has been stirred for some time, it becomes soluble in water to a clear solution. The latter is used as such or converted into a sodium salt by neutralization or the like. The yield in the form of the sodium salt amounts to 590 parts by weight. The product is a light-brown powder which is soluble in water to a clear solution possessing in a high degree the property of wetting. Instead of naphthalene there may be used anthracene or the like and instead of n-butyl alcohol its homologues and isomerides, also cyclohexanol, methylcyclohexanol etc. The final product thus obtained probably has about the following formula:

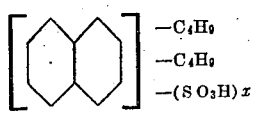

wherein $x$ stands for a whole number not greater than 6.

(6) Into 35 parts by weight of butyl alcohol pre-heated to 70° C. are introduced 178 parts of anthracene and there are then added by drops at 70° C. 25 parts by weight of oleum of 20% strength and 25 parts by weight of chlorosulphonic acid. Into this mixture are then run 100 parts by weight of chlorosulphonic acid and 79 parts by weight of butyl alcohol and 100 parts by weight of oleum of 20% strength. The whole is then stirred at 80–90° C. for several hours until the evolution of hydrochloric acid has ceased. The mass is then diluted with water, neutralized with caustic soda solution and dried. Thus, a water-soluble dark grey product is obtained whose water solution possesses in a high degree the property of forming froth and wetting. The final product thus obtained probably has about the following formula:

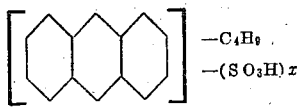

wherein $x$ stands for a whole number not greater than 6.

(7) Into 78 parts by weight of benzene and 100 parts by weight of cyclohexanol are run at 70–80° C. 220 parts by weight of oleum of 20% strength. After stirring the mixture for several hours, it is diluted with water, neutralized with caustic soda solution and dried. Thus, a light-colored powder, readily soluble in water, is produced.

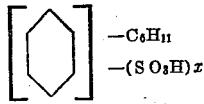

wherein $x$ stands for a whole number not greater than 6.

(8) By subjecting to reaction 128 parts by weight of naphthalene, 74 parts of butyl alcohol and 170 parts by weight of chlorosulphonic acid a product is obtained which dissolves in water to a clear solution; to this product are added 100 parts by weight of water and 50 parts by weight of a solution of formaldehyde of 40% strength and the whole is kept at a temperature of 60–70° C. until the condensation is complete. The final product thus obtained yields a light sodium salt which has an agreeable odor and possesses in a high degree the property of forming froth and wetting. The final product thus obtained probably has about the following formula:

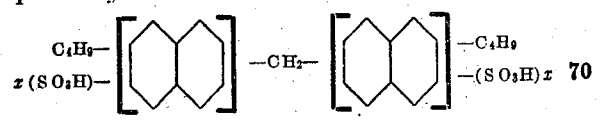

wherein $x$ stands for a whole number not greater than 6.

(9) Instead of using water and formaldehyde of 40% strength as in the foregoing Example 8, there are used 60 parts by weight of sulfur chloride (SCl$_2$), the other compounds and quantities being the same as in the foregoing example. After the reaction and neutralization is complete, a readily soluble, olive colored sodium salt is obtained which possesses in a high degree the property of forming froth, of producing resists against dyestuffs and of equalizing well and also possesses remarkable antiseptic properties. The final product thus obtained probably has about the following formula:

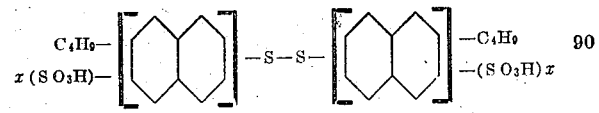

wherein $x$ stands for a whole number not greater than 6.

(10) The same operations are carried out as those indicated in Example 9 with the exception that there is at first run in the sulfur chloride and the main portion of the acid and then the butyl alcohol and the remainder of the acid. The result obtained is similar to that stated in Example 9. The final product thus obtained probably has about the following formula:

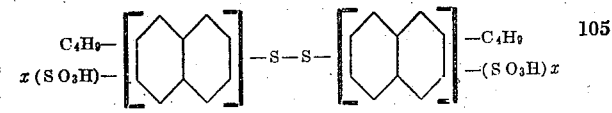

wherein $x$ stands for a whole number not greater than 6.

We claim:

1. Process of preparing substituted aryl-poly-sulphonic acids, which comprises treating a mixture of an aromatic hydrocarbon and a purely aliphatic alcohol of higher molecular weight than ethyl alcohol, with a stronger sulfonating agent than sulfuric acid monohydrate.

2. The process of preparing substituted aryl-poly-sulphonic acids which comprises treating a mixture of naphthalene and a purely aliphatic alcohol having more than two carbon atoms with chloro-sulphonic acid at a temperature of about 60° to about 100° C.

3. The process of preparing substituted aryl-poly-sulphonic acids which comprises treating one mole of naphthalene and one mole of a purely aliphatic alcohol having more than two carbon atoms with chloro-sulphonic acid at a temperature of about 60° to 100° C.

4. Process of preparing substituted aryl-poly-sulphonic acids, which comprises treating a mixture of an aromatic hydrocarbon and a purely aliphatic alcohol of higher molecular weight than ethyl alcohol, with a stronger sulphonating agent than sulfuric acid monohydrate, and treating the resulting sulphonated condensation product with an agent which is capable of linking aromatic nuclei with formation of a bridge.

5. Process of preparing substituted aryl poly-sulphonic acids, which comprises treating a mixture of an aromatic hydrocarbon and an alcohol of higher molecular weight than ethyl alcohol, with a stronger sulphonating agent than sulfuric acid monohydrate, and treating the resulting sulfonated condensation product with sulfur chloride.

6. The process of preparing substituted aryl polysulphonic acids, which comprises treating a mixture of naphthalene and an aliphatic alcohol having more than two carbon atoms, with chloro-sulphonic acid at a temperature of about 60° to about 100° C., and treating the resulting sulphonated condensation product with sulfur chloride at a temperature of about 60-70° C.

7. As new products, aryl-poly-sulphonic acids which are substituted by at least one purely aliphatic alkyl group having more than two carbon atoms.

8. As new products, naphthalene-polysulphonic acids which are substituted by at least one purely aliphatic alkyl group having more than two carbon atoms.

9. As new products naphthalene-polysulfonic acids which are substituted by at least one n-butyl group.

10. As new products naphthalene polysulphonic acids which are substituted by at least one alkyl group having more than two carbon atoms and which contain at least two naphthalene nuclei which are linked by at least one —S—S— bridge.

11. As new products naphthalene polysulphonic acids which are substituted by at least one *n*-butyl group and which contain at least two naphthalene nuclei which are linked by at least one —S—S— bridge.

In testimony whereof, we affix our signatures.

KARL DAIMLER.
GERHARD BALLE.